United States Patent [19]

Tanaka

[11] Patent Number: 4,779,855

[45] Date of Patent: Oct. 25, 1988

[54] SUSPENSION SUPPORT STRUCTURE BEING FREE FROM TORSION AND PINCH

[75] Inventor: Toshio Tanaka, Susono, Japan

[73] Assignee: Toyota Jidosha Kabushiki Kaisha, Toyota, Japan

[21] Appl. No.: 132

[22] Filed: Jan. 2, 1987

[30] Foreign Application Priority Data

Jan. 16, 1986 [JP] Japan ............................. 61-5003

[51] Int. Cl.⁴ ..................... B60G 11/56; F16C 23/04
[52] U.S. Cl. ................................. 267/220; 267/221; 267/34; 280/668; 384/203
[58] Field of Search ................... 267/33, 34, 35, 152, 267/153, 217, 219, 220, 221, 256, 276, 294, 292; 280/668, 696; 384/192, 203, 206, 213, 214

[56] References Cited

U.S. PATENT DOCUMENTS 3,947,077  3/1976  Berg et al. ................. 384/213 X
4,256,292  3/1981  Sullivan, Jr. et al. ............. 267/220

FOREIGN PATENT DOCUMENTS 58-63441  4/1983  Japan .
60-7355   1/1985  Japan .

Primary Examiner—Duane A. Reger
Assistant Examiner—Robert J. Oberleitner
Attorney, Agent, or Firm—Oblon, Fisher, Spivak, McClelland & Maier

[57] ABSTRACT

A structure for supporting with a car body a suspension having a shock absorber and a coil spring disposed to surround the shock absorber includes a first support having an elastic body and a spherical bearing and fixed to the car body, a spring seat fixed to the first support at the inside thereof for receiving an upper end of the coil spring and a second support fixed to the spring seat at the inside thereof and coupled with a piston rod of the shock absorber.

11 Claims, 4 Drawing Sheets

F I G. 1
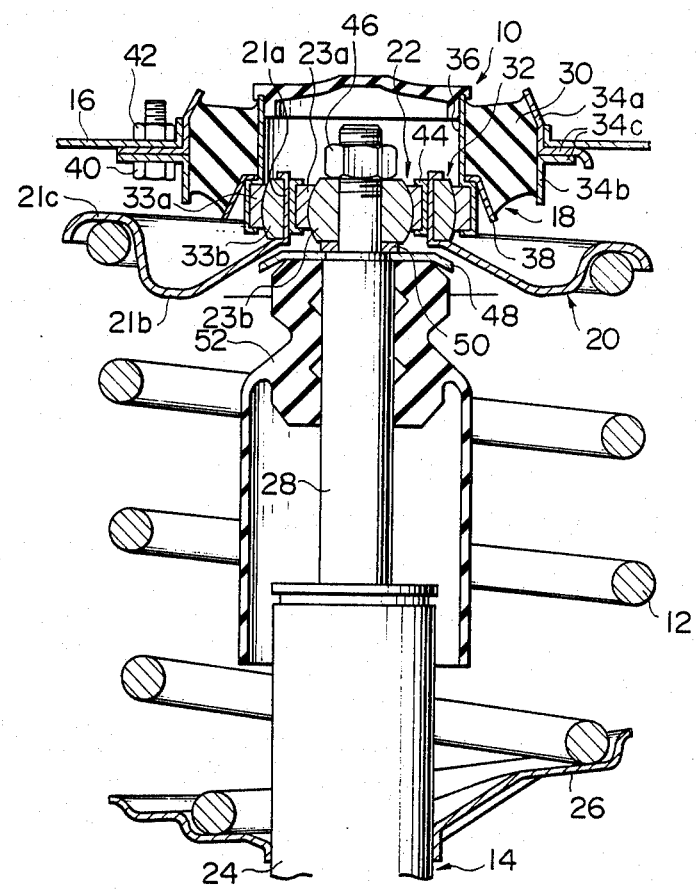

F I G. 3
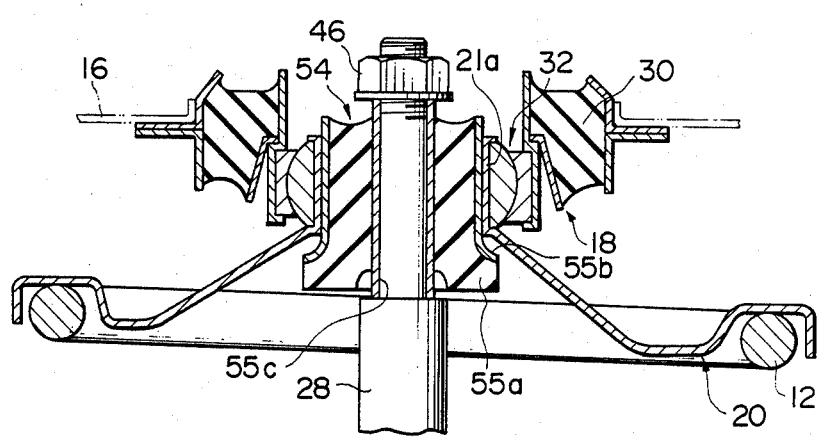

SUSPENSION SUPPORT STRUCTURE BEING FREE FROM TORSION AND PINCH

BACKGROUND OF THE INVENTION

1. Field of the Invention

This invention relates to a support structure for a suspension and, more particularly to a structure for supporting with a car body a so-called Mac Pherson strut type suspension of an automobile having a shock absorber and a coil spring disposed to surround the shock absorber.

2. Description of the Prior Art

In a Mac Pherson strut type suspension having a coil spring disposed to surround a shock absorber, a spring seat for receiving an upper end of the coil spring is provided in relation to a structure for supporting the suspension with a car body.

In a support structure disclosed in the Japanese Utility Model Public Disclosure (KOKAI) No. 63441/83, a tubular mount disposed above a spring seat is fixed on outer and inner peripheral surfaces respectively to tubular elastic bodies provided independently and the outside elastic body is mounted on a car body. Also, a piston rod of a shock absorber is coupled with the inside elastic body to be mounted on the car body through two elastic bodies eventually.

SUMMARY OF THE INVENITON

According to the support structure disclosed in said Utility Model Public Disclosure, vibration transmitted from a coil spring and vibration from a shock absorber are received respectively by elastic members or elastic bodies disposed outside and inside the spring seat, so that spring constants of respective elastic bodies may be selected suitably for the vibration to improve ride comfort.

However, torsion and pinch such as to deform both elastic bodies about an axis of a piston rod act on both elastic bodies through spring reaction transmitted to the spring seat in bound and rebound of a wheel. Therefore, spring properties of both elastic bodies and the characteristics of vehicle may be liable to change. Particularly, since the elastic body disposed outside the spring seat is a portion for receiving large input from the coil spring, the characteristics of vehicle is remarkably affected even by small change in the spring property of the outside elastic body.

A suspension for a vehicle separately proposed (Utility Model Application No. 7355/85) and lower spring carriers for receiving upper and lower ends of a coil spring and a self-aligning bearing engaging the upper or lower spring carrier. The self-aligning bearing is provided with a first bearing member having a convex spherical surface locating the center thereof on an axis of a shock absorber and provided on one of the shock absorber and spring carrier and a second bearing member having a concave spherical surface fitting to the convex spherical surface and provided on the other of the shock absorber and spring carrier.

According to the suspension noted above, the surface pressure on the spring carrier abutting against the coil spring may be held uniformly and deviation of coil spring reaction may be reduced to minimize moment applied to the shock absorber.

An object of the present invention is to provide a support structure for a suspension which may receive vibrations transmitted from a coil spring and a shock absorber with individual support means and does not generate any pinch and torsion to an elastic body disposed outside a spring seat when spring reaction acts on the spring seat.

According to the present invention, there is provided a structure for supporting with a car body a suspension having a shock absorber and a coil spring disposed to surround the shock absorber. The support structure comprises a first support means having an elastic body and a spherical bearing and fixed to said car body, a spring seat fixed to the first support means at the inside thereof, for receiving an upper end of said coil spring and a second support means fixed to the spring seat at the inside thereof and coupled with a piston rod of said shock absorber.

When spring reaction acts on the spring seat in bound and rebound of a wheel supported by the suspension, the spring seat is displaced by the action of the spherical bearing of the first support means to absorb torsional force and pinching force for preventing the elastic body of the first support means from the occurrence of torsion and pinch.

Since no torsion and pinch are found in the elastic body of the first support means, the spring property of the elastic body is not changed and the characteristics of the vehicle may be held at a set condition.

The second support means may be made of a spherical bearing, elastic body or combination of spherical bearing and elastic body at will according to the type of the vehicle. When the second support means is made of the elastic body or combination of spherical bearing and elastic body, vibration from the coil spring is received by the elastic body of the first support means and vibration from the shock absorber is received by the elastic body of the second support means so that the spring constant of each elastic body may be set suitably for the vibration to improve vibration restraining effect.

BRIEF DESCRIPTION OF THE DRAWINGS

The other objects and features of the invention will become apparent from the following description of preferred embodiments of the invention with reference to the accompanying drawings, in which:

FIG. 1 is a sectional view showing a support structure;

FIGS. 3 to 5 are sectional views showing principal parts of further embodiments of the support structure, respectively.

DESCRIPTION OF PREFERRED EMBODIMENTS

Figure 2:
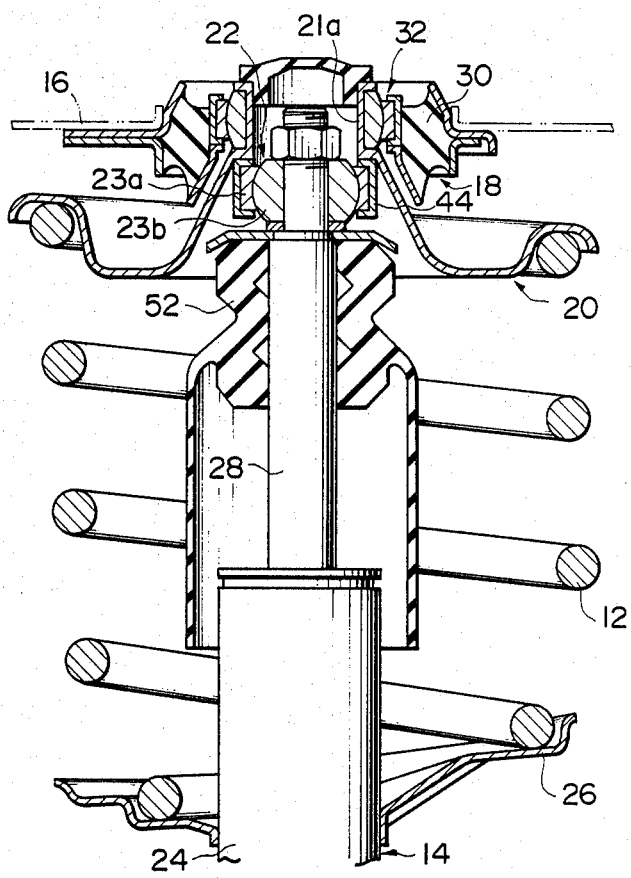
FIG. 2 is a sectional view showing a different embodiment of the support structure.

As shown in FIG. 1, a support structure 10 for supporting with a car body 16 a suspension having a shock absorber 14 and a coil spring 12 disposed to surround the shock absorber 14 comprises a first support means 18, a spring carrier or spring seat 20 and a second support means 22.

The coil spring 12 is engaged at an upper end thereof by the spring seat 20, which will be later described, and at a lower end thereof by a spring seat 26 welded to a cylinder 24 of the shock absorber 14.

The shock absorber 14 is provided with the cylinder 24, a piston (not shown) and a piston rod 28. A lower end of the shock absorber 14 is coupled with a suspension arm through a wheel carrier. Since said constitution is well known per se and not directly related to the present invention, the illustration and detailed description of said constitution will be omitted. Further, a so-called twin tube type of shock absorber provided with two cylinders disposed concentrically or a so-called mono-tube type one provided with a single cylinder is used for the shock absorber 14.

The first support means 18 of the support structure 10 has an elastic body 30 and a spherical joint or spherical bearing 32 and is formed as a whole annularly. In the embodiment shown in FIG. 1, the elastic body 30 is formed of tubular rubber and has a first outer tube 34a and a second outer tube 34b adhered to an outer peripheral surface thereof. Also, an inner tube 36 and a separator 38 are adhered to an inner peripheral surface of the elastic body 30. Bolts 40, only one is shown in the drawing, extend through flanges 34c of the first and second outer tubes 34a, 34b to the car body 16 and nuts 42 are screwed onto the bolts 40 to mount the elastic body 30 on the car body 16.

The spherical bearing 32 comprises an annular first member 33a having an inner peripheral surface formed into a concave spherical surface and an annular second member 33b having an outer peripheral surface formed into a convex spherical surface fitting to the concave spherical surface of the first member 33a, the first member 33a being fixed to the inner tube 36 by caulking the inner tube 36. The second member 33b is rotatably and swingably fitted in the first member 33a.

The spring seat 20 has integrally a tubular mounting portion 21a fixed to the first support means 18 at the radially inside portion thereof with respect to the longitudinal axis of piston rod 28, a connecting portion 21b extending downwardly divergently from the mounting portion 21a and an engaging portion 21c disposed at the outside of the connecting portion 21b, for receiving an upper end of the coil spring 12. In the embodiment shown, the mounting portion 21a is caulked to fix to the second member 33b of the spherical bearing 32.

The second support means 22 is a spherical bearing which includes an annular first member 23a having an inner peripheral surface formed into a concave spherical surface and an annular second member 23b having an outer peripheral surface formed into a convex spherical surface fitting to the concave spherical surface of the first member 23a. The first member 23a is caulked to be fixed to a ring 44 which is press fitted into the mounting portion 21a of the spring seat 20. The second member 23b is fitted rotatably and swingably into the first member 23a.

An end of the piston rod 28 is inserted into the second member 23b of the second support means 22 and a nut 46 is threaded onto said end to couple the piston rod 28 with the second member 23b. Between the second member 23b and a shoulder of the piston rod 28 are disposed an annular holder plate 48 and a spacer 50, the holder plate 48 holding a bound stopper 52.

According to the embodiment shown in FIG. 1, the elastic body 30 is prevented from torsion and pinch at the time of bounding and rebound by the spherical bearing 32 of the first support means 18. Further, since lateral force and bending moment generated on the basis of the deviated abutment of the coil spring 12 against the spring seat 20 are absorbed by the spherical bearing 32 of the second support means 22, deviated wear of the piston rod 28 or piston due to such force and moment may be prevented.

An embodiment shown in FIG. 2 is similar to that shown in FIG. 1 in such points that the first support means 18 has the elastic body 30 and the spherical bearing 32 and the second support means 22 is formed of the spherical bearing having the first and second members 23a, 23b. In the embodiment shown in FIG. 2, however the spherical bearing 32 of the first support means is disposed on an upper portion of the inner peripheral surface of the elastic body 30, while the second support means 22 is located at the radial inside portion of the spring seat 20 and the ring 44 is welded to the mounting portion 21a at the lower end of the mounting portion 21a of the spring seat 20. Other constitutions, operations and effects in the embodiment shown in FIG. 2 are similar to those shown in FIG. 1.

In an embodiment shown in FIG. 3, the first support means 18 is constituted from the elastic body 30 and the spherical bearing 32 similarly to that shown in FIG. 1, while a second support means 54 includes a rubber bushing 55a an outer tube 55b and an inner tube 55c respectively adhered to the bushing 55a. The outer tube 55b is press fitted into the mounting portion 21a of the spring seat 20, while the end of piston rod 28 extends through the inner tube 55c.

According to the embodiment shown in FIG. 3, the elastic body 30 at the time of bound and rebound is prevented from tortion and pinch by the spherical bearing 32 of the first support means 18. Further, since the elastic body 30 of the first support means 18 receives the vibration transmitted from the coil spring 12 and the bushing 55a of the second support means 54 receives the vibration transmitted from the shock absorber 14 respectively, the respective spring constants may be selected suitably for the vibration to improve ride comfort.

Figure 4:
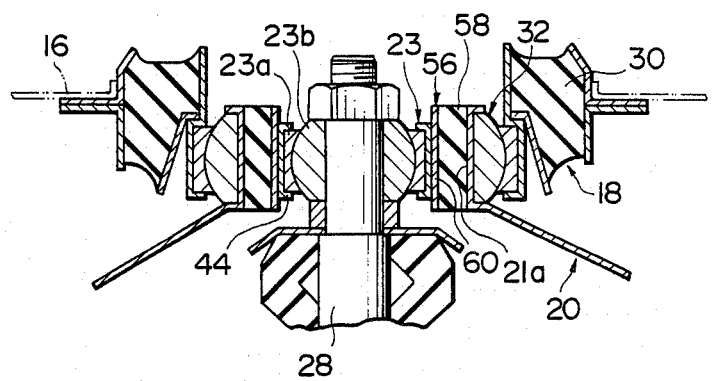

In an embodiment shown in FIG. 4, the first support means 18 having the elastic body 30 and the spherical bearing 32 is similar to that shown in FIG. 1, while a second support means 56 includes a spherical bearing 23 and a rubber bushing 58.

The spherical bearing 23 is similar to one provided as the second support means in the embodiment shown in FIG. 1 and includes the annular first member 23a having an inner peripheral surface formed into a concave spherical surface and the annular second member 23b having an outer peripheral surface formed into a convex spherical surface fitting to the concave spherical surface of the first member 23a. On the other hand, the bushing 58 is adhered on an outer peripheral surface thereof to the mounting portion 21a of the spring seat 20 and on an inner peripheral surface thereof to a tubular member 60. The ring 44 fixed to the first member 23a is press fitted into the tubular member 60.

According to the embodiment shown in FIG. 4, the elastic body 30 at the time of bounding and rebound is prevented from torsion and pinch by the spherical bearing 32 of the first support means 18. Further, since lateral force and bending moment generated on the basis of deviated abutment of the coil spring against the spring seat 20 may be absorbed by the spherical bearing 23 of the second support means 56, the deviated wear of the piston rod 28 or piston due to such force and moment may be prevented. Further, since the elastic body 30 of the first support means 18 receives the vibration transmitted from the coil spring and the bushing 58 of the second support means 56 receives the vibration transmitted from the shock absorber 14 respectively, the respective spring constants may be selected suitably for the vibration.

Figure 5:
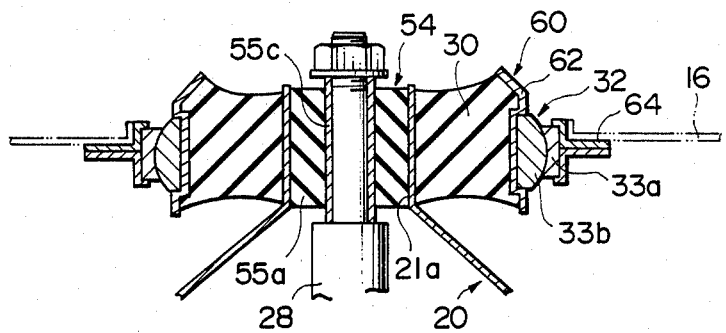

In an embodiment shown in FIG. 5, while a first support means 60 has the elastic body 30 and the spherical bearing 32, the elastic body 30 is different from that shown in FIG. 1 in such point that it is disposed at the inside of the spherical bearing 32. The second support means 54 similarly to the support means shown in FIG. 3, has a rubber bushing 55a.

The elastic body 30 is adhered at an outer peripheral surface thereof to a tubular member 62 and on an inner peripheral surface thereof to the mounting portion 21a of the spring seat 20. The tubular member 62 is caulked to fix the second member 33b of the spherical bearing 32 thereto. The first member 33a of the spherical bearing 32 is sandwiched by a pair of plate members 64 hich are mounted on the car body 16. The bushing 55a of the second support means 54 is adhered on an outer peripheral surface thereof to the mounting portion 21a of the spring seat 22 and on an inner peripheral surface thereof to the inner tube 55c respectively.

According to the embodiment shown in FIG. 5, the elastic body 30 at the time of bounding and rebound is prevented from torsion and pinch by the spherical bearing 32 of the first support means 60. Further, since the elastic body 30 of the first support means 60 receives the vibration transmitted from the coil spring and the bushing 55a of the second support means 54 receives the vibration transmitted from the shock absorber 14 respectively, the respective spring constants may be selected suitably for the vibration.

What is claimed is:

1. A structure for supporting with a car body a suspension having a shock absorber and a coil spring disposed to surround the shock absorber, comprising:
   a first support means having an elastic body and a spherical bearing and fixed to said car body;
   a spring seat fixed to the first support means at the inside thereof and receiving an upper end of said coil spring; and
   a second support means fixed to the spring seat at the inside thereof and coupled with a piston rod of said shock sbsorber,
   wherein said shock absorber is fixed to the car body through said first and second support means such that said elastic body of the first support means is free from torsion and pinch generated by both the shock absorber and the coil spring at the time of bounding and rebounding of a wheel.

2. A support structure for a suspension as claimed in claim 1, wherein said elastic body of said first support means is disposed at the outside of said spherical bearing.

3. A support structure for a suspension as claimed in claim 1, wherein said elastic body of said first support means is disposed at the inside of said spherical bearing.

4. A support structure for a suspension as claimed in claim 1, wherein said spherical bearing of said first support means has a first member disposed at the outside and a second member disposed at the inside, both members engaging with each other through spherical surfaces respectively formed thereon.

5. A support structure for a suspension as claimed in claim 4, wherein said first member has a concave spherical surface on an inner periphery and the second member has a convex spherical surface on an outer periphery.

6. A support structure for a suspension as claimed in claim 1, wherein said spring seat has integrally a tubular mounting portion fixed to said first support means, a connecting portion extending from the mounting portion and an engaging portion disposed at the outside of the connecting portion to receive the upper end of said coil spring.

7. A support structure for a suspension as claimed in claim 1, wherein said second support means has an elastic body.

8. A structure for supporting with a car body a suspension having a shock absorber and a coil spring disposed to surround the shock absorber, comprising:
   a first support means having an elastic body and a spherical bearing and fixed to said car body;
   a spring seat fixed to the first support means at the inside thereof and receiving an upper end of said coil spring; and
   a second support means having a spherical bearing and fixed to the spring seat at the inside thereof, said second means being coupled with a piston rod of said shock absorber.

9. A support structure for a suspension as claimed in claim 8, wherein said spherical bearing of said second support means has a first member disposed at the outside and a second member disposed at the inside, both members engaging with each other through spherical surfaces respectively formed thereon.

10. A support structure for a suspension as claimed in claim 9, wherein said first member has a concave spherical surface on an inner periphery and said second member has a convex spherical surface on an outer periphery.

11. A structure for supporting with a car body a suspension having a shock absorber and a coil spring disposed to surround the shock absorber, comprising:
   a first support means having an elastic body and a spherical bearing and fixed to said car body;
   a spring seat fixed to the first support means at the inside thereof and receiving an upper end of said coil spring; and
   a second support means having an elastic body and a spherical bearing and fixed to the spring seat at the inside thereof, said second means being coupled with a piston rod of said shock absorber.

* * * * *